UNITED STATES PATENT OFFICE.

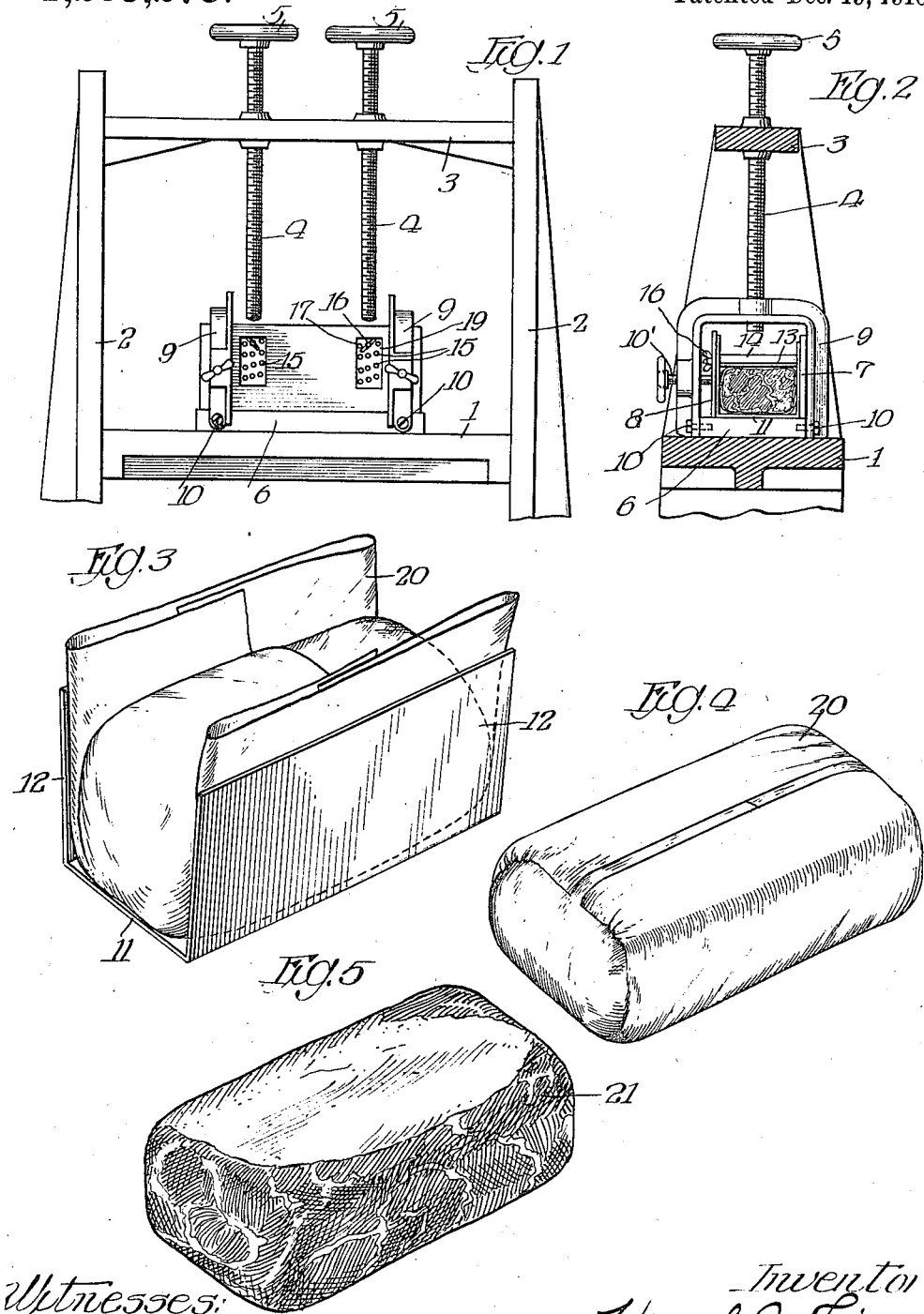

HUGH J. FINN, OF KANSAS CITY, MISSOURI, ASSIGNOR TO SULZBERGER & SONS COMPANY, OF CHICAGO, ILLINOIS, A CORPORATION OF NEW YORK.

METHOD OF TREATING JOINT-MEAT AND THE LIKE AND PRODUCT THEREOF.

1,209,275.    Specification of Letters Patent.    Patented Dec. 19, 1916.

Application filed May 1, 1916. Serial No. 94,827.

*To all whom it may concern:*

Be it known that I, HUGH J. FINN, a citizen of the United States, residing at Kansas City, in the county of Jackson and State of Missouri, have invented certain new and useful Improvements in Methods of Treating Joint-Meat and the like and Products Thereof, of which the following is a specification.

This invention relates to a method of treating hams, shoulders or joint meat in general to produce "square" joints, so-called, and to the product of such a method.

There is a large and growing demand in the trade for cooked hams intended to be cut into a plurality of thin slices for ultimate consumption. Hams are naturally of irregular form and in order that they may be sliced to the best advantage to avoid waste it is desirable that the hams be given a predetermined and rectangular form. This is particularly true where the hams are sliced by machines of which there are now numerous examples on the market.

It is an object, therefore, of my invention to provide a simple and effective method of treating joint meat in general, whereby it is provided with a plurality of rectangular faces.

A further object of my invention is the provision of a ham or the like so formed as to be best adapted for economical slicing.

Further objects and advantages of my invention will be apparent as it is better understood by reference to the following specification when read in connection with the accompanying drawing; illustrating the preferred embodiment thereof, in which—

Figure 1 is a side elevation of an apparatus for carrying out my method; Fig. 2 is an end elevation of the apparatus; Fig. 3 is a view in perspective illustrating the ham wrapped and disposed in the mold of the apparatus; Fig. 4 is a view in perspective of the wrapped ham after it has been caused to assume the desired form, and Fig. 5 is a view in perspective of the finished product.

Referring to the drawing, 1 indicates a suitable base to which a pair of uprights 2 are secured. A member 3 is secured to the uprights 2 and supports a pair of screws 4 extending downwardly and having suitable hand wheels 5 to apply pressure as will presently appear, Mounted on the base 1 is a bed 6 having a side-plate 7 integral therewith or secured thereto. A loose side-plate 8 is adapted to be disposed opposite the side-plate 7, the side-plates 7 and 8 being embraced by the clamping members 9 pivotally secured at 10 to the bed 6. Screws 10' are mounted in the clamping members 9 to provide means for forcing the movable side-plate 8 toward the side-plate 7.

A mold comprising a bottom 11 and sides 12, formed integral therewith, is adapted to be mounted on the bed 6 between the side-plates 7 and 8, a movable top 13 being disposed between the sides 12 of the mold. A pressure plate 14, adapted to receive the thrust of the screws 4, is disposed above the top 13 and transfers pressure thereto. The sides 12 of the mold are provided with a plurality of alined holes 15 through which the bolts 16 having wing unts 17 on their ends may be selectively disposed to lock the sides 12 and the top 13 in position after the material within the mold has been compressed. The pressure plate 14 is provided with slots in its under face and the side-plates 7 and 8 are provided with suitable openings 19 to facilitate the insertion of the bolts 16.

In carrying out my invention the ham, which is of usual form, is boned and inclosed in a suitable wrapper 20, preferably of strong textile fabric, the wrapper being folded to secure the ends of the ham and to prevent material elongation thereof. The wrapped ham is disposed in the mold as indicated in Fig. 3. Obviously the mold may be of suitable size to receive the ham and may vary in size to accommodate hams of different weight. A plurality of molds are provided to allow the continuous operation of the method.

The top 13 is inserted above the ham and the pressure plate 14 is disposed thereon. The mold may be then arranged on the bed 6 between the side-plates 7 and 8 and pressure may be applied by the screws 4 and 10' until the ham is forced to assume the form of the mold and is thereby provided with rectangular sides, the fatty portion of the ham being distributed about and through the fibrous portion. When the ham has been suitably compressed the bolts 16 are inserted in selected holes to lock the sides 12 and the top 13 of the mold in position.

The screws 4 and 10' are then released, the mold is withdrawn and the ham is cooked for a suitable period in its compressed condition. When the cooking has been completed, the ham is taken from the mold, the wrapper 20 is removed and the ham 21 is found to have assumed the form indicated in Fig. 5 and is ready for the market.

While I have described my invention particularly with respect to hams it is equally applicable to the treatment of shoulders or joint meat in general. Meat treated in accordance with my invention is, because of its rectangular form, much more readily sliced and the percentage of waste in slicing is materially reduced, thus effecting considerable saving. Moreover, because of its form the ham may be thoroughly cooked in a shorter period than would be necessary if allowed to remain in its natural form. My invention fills a long-felt requirement of the trade and accomplishes definite and useful results, the resulting product being distinguished from similar products heretofore known in the art.

It will be apparent that various changes may be made in the method as described as well as in the exact form given to the product within the scope of the appended claims without sacrificing any of the material advantages thereof, the form of my invention hereinbefore described being merely the preferred embodiment thereof.

I claim:

1. As a new article of manufacture, a cooked meat joint having its bones removed and being compacted in a direction transverse to the length of the fibers to fill the voids caused by the removal of the bones, with its top, bottom and sides flattened, and substantially rectangular in form.

2. The herein described method of treating joint meat which consists in removing the bones, disposing the joint in a suitable mold, subjecting the joint in said mold to compression in directions transverse to the meat fibers while the joint is restrained from expansion longitudinally of said fibers to compact the joint and fill the voids caused by the removal of the bones and to flatten the opposite sides of the joint and cause said sides to assume a rectangular form, and cooking the joint while under compression.

3. The herein described method of treating joint meat which consists in removing the bones, inclosing the joint in a wrapper, disposing the wrapped joint in a suitable mold, subjecting the joint in said mold to compression in directions transverse to the meat fibers while the joint is restrained from expansion longitudinally of said fibers by said wrapper to compact the joint and fill the voids caused by the removal of the bones and to flatten the opposite sides of the joint and cause said sides to assume a rectangular form, and cooking the joint while under compression.

HUGH J. FINN.

Witnesses:
WM. R. BURNABY,
ANNA S. FRYDENLUND.